United States Patent [19]

Morinaud

[11] Patent Number: 5,267,581
[45] Date of Patent: Dec. 7, 1993

[54] POLLUTION ABATING VAPOR TRAP AND CONDENSER APPARATUS

[76] Inventor: Pierre C. Morinaud, 3241 Dundonald Ct., San Jose, Calif. 95121

[21] Appl. No.: 816,809

[22] Filed: Jan. 3, 1992

[51] Int. Cl.⁵ .............................................. B08B 3/10
[52] U.S. Cl. .................................. 134/105; 134/108; 134/200
[58] Field of Search .................. 134/76, 105, 108, 200

[56] References Cited

U.S. PATENT DOCUMENTS

| | | | |
|---|---|---|---|
| 2,374,535 | 4/1945 | Gibson | 134/105 |
| 2,772,523 | 12/1956 | Ruthner | 134/76 |
| 2,933,032 | 4/1960 | Pardee | 134/76 |
| 3,225,675 | 12/1965 | Cross et al. | 134/76 X |
| 3,968,013 | 7/1976 | Boynton . | |
| 3,996,949 | 12/1976 | Boynton . | |
| 4,089,339 | 5/1978 | Boynton . | |
| 4,101,340 | 7/1978 | Rand . | |
| 4,486,239 | 12/1984 | du Fresne . | |
| 4,714,010 | 12/1987 | Smart | 134/76 |
| 4,973,387 | 11/1990 | Osterman et al. . | |
| 4,983,223 | 1/1991 | Gessner . | |
| 5,054,210 | 10/1991 | Schumacher et al. | 134/107 X |
| 5,103,846 | 4/1992 | Clark et al. | 134/108 X |
| 5,113,882 | 5/1992 | Gileta | 134/105 X |
| 5,143,103 | 9/1992 | Basso et al. | 134/107 |

*Primary Examiner*—Frankie L. Stinson
*Attorney, Agent, or Firm*—Willian Brinks Olds Hofer Gilson & Lione

[57] ABSTRACT

An apparatus for and method abating discharges of chemicals into the environment. The apparatus comprises a retractable top and a shroud to trap and recondense vapors emanating from open-top chemical processing and solvent cleaning tanks. The retractable top is formed by a plurality of panels that are pivotally attached to the top of the tank. The temperature of the interior surfaces of the panels is controlled to create an equithermal zone across the top of the tank.

11 Claims, 4 Drawing Sheets

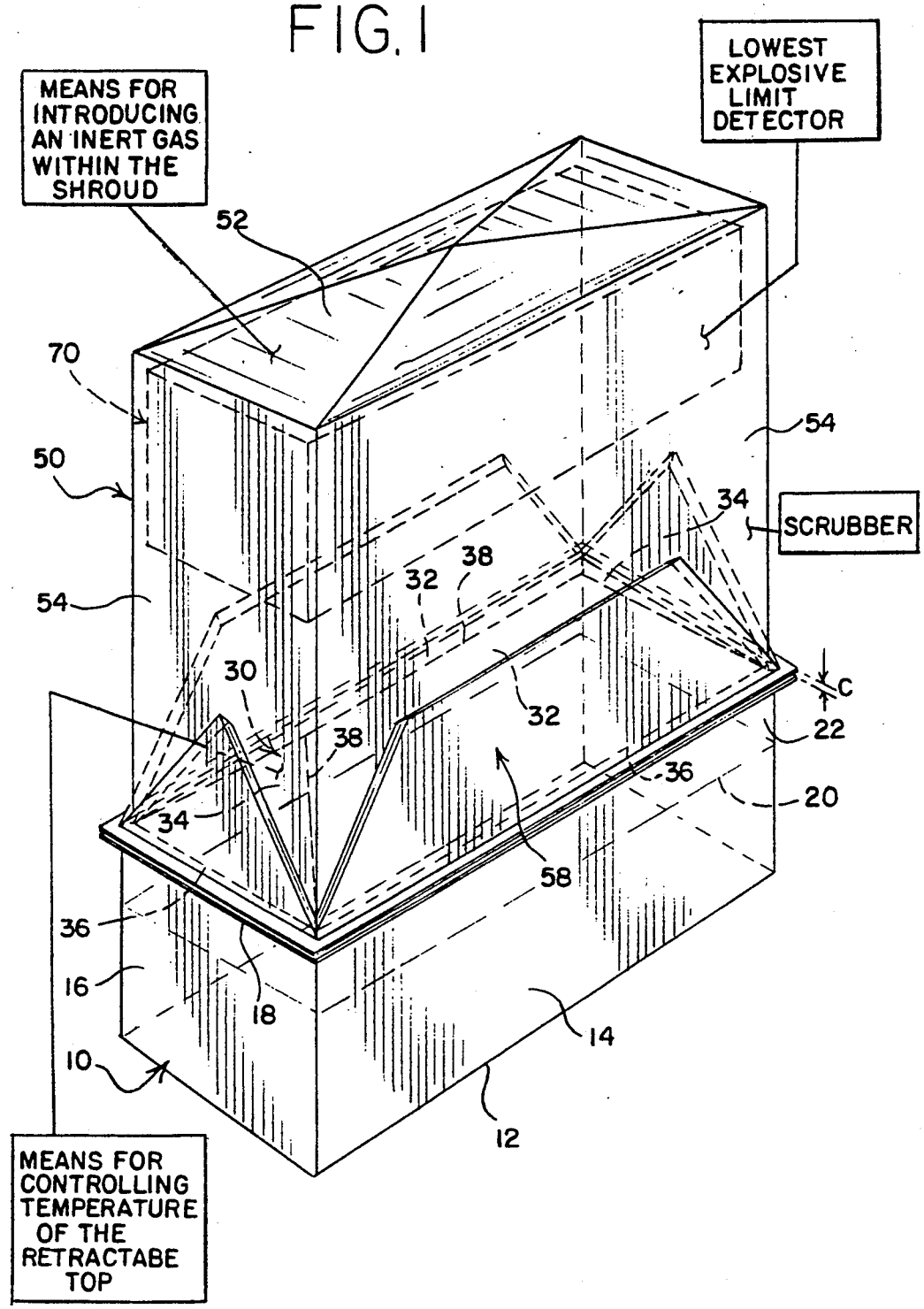

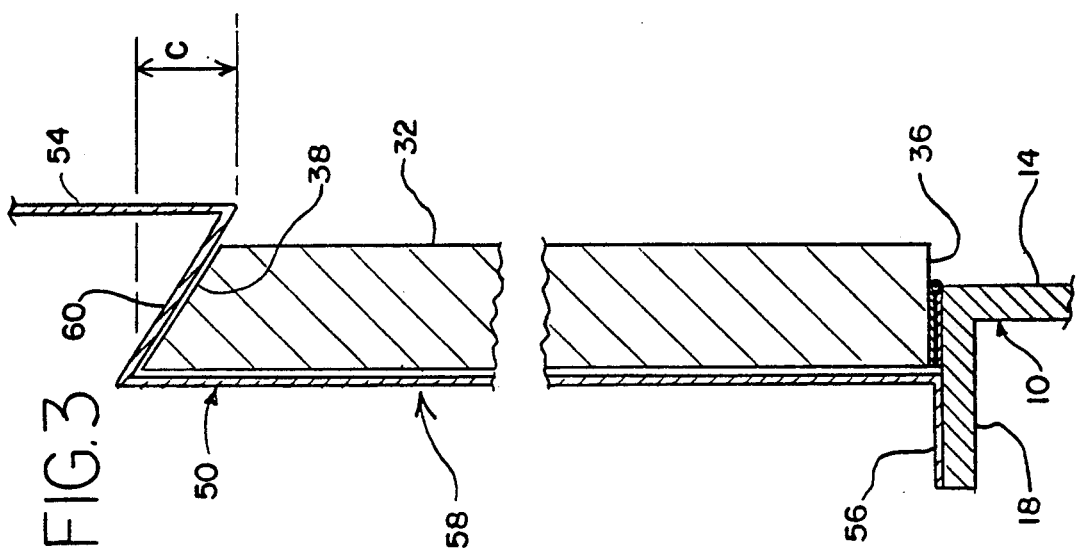
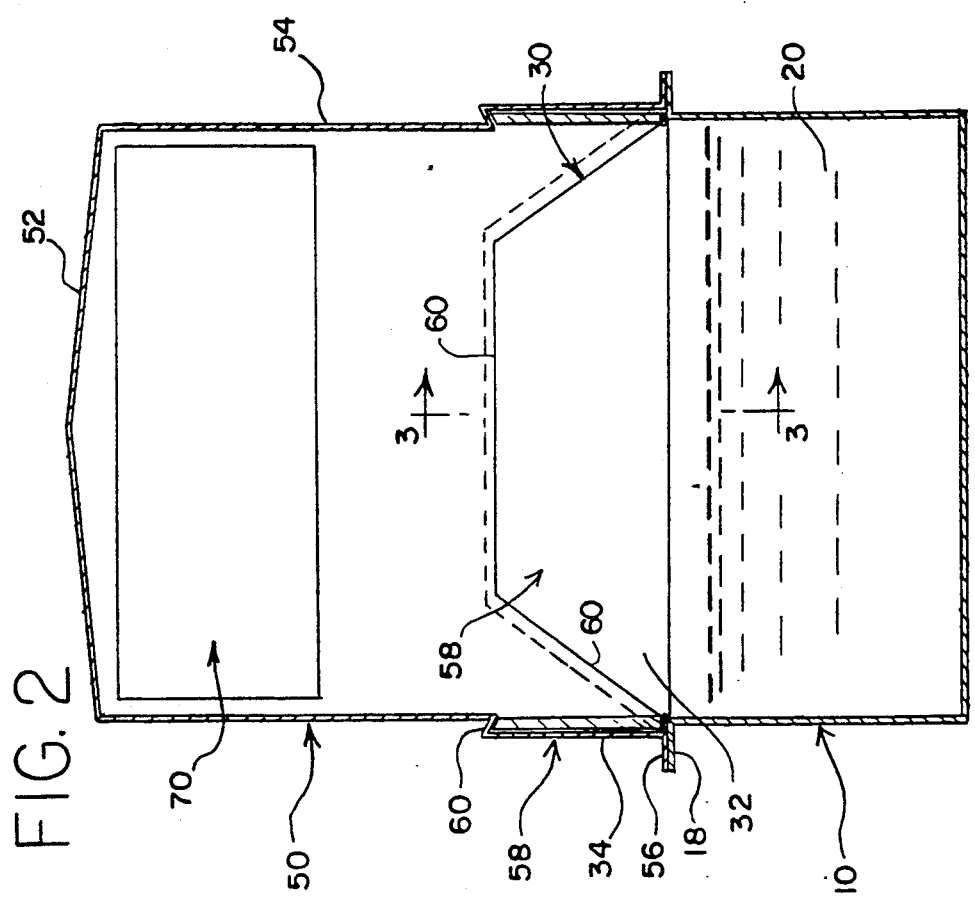

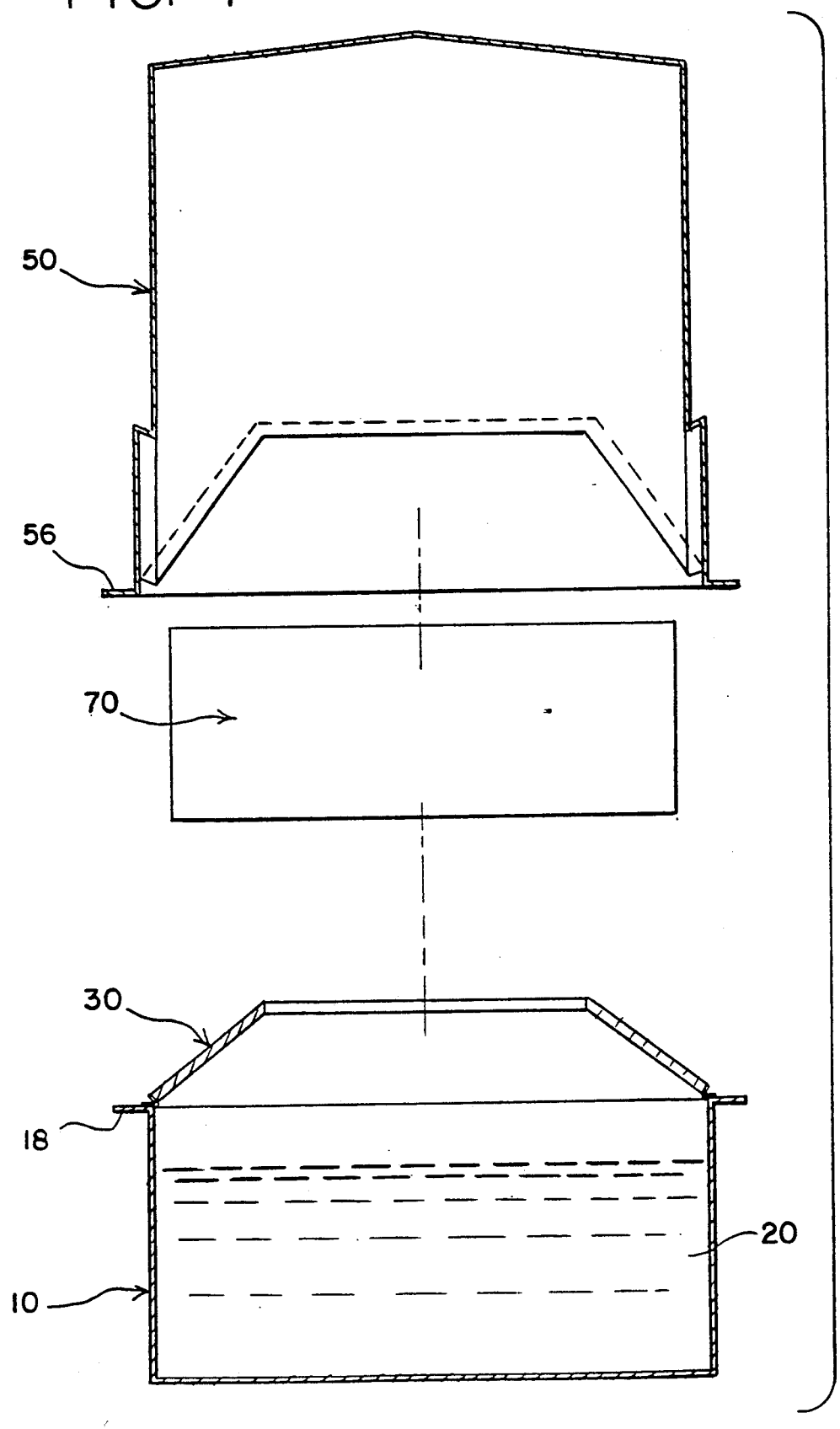

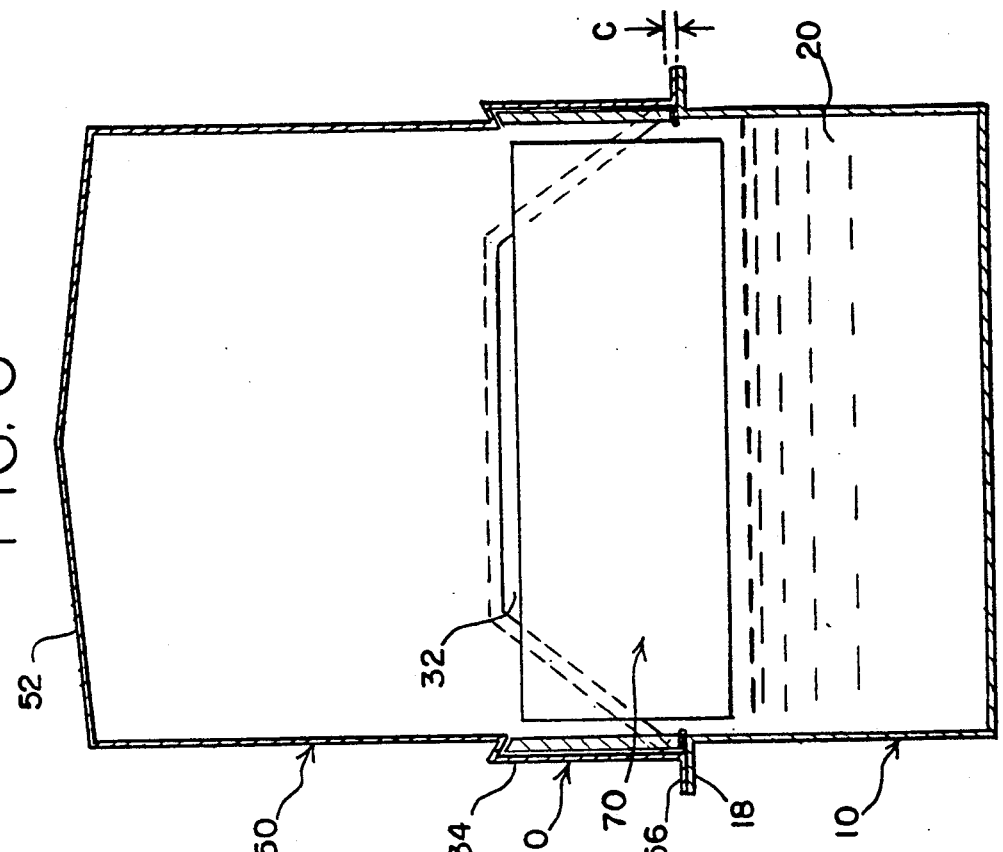
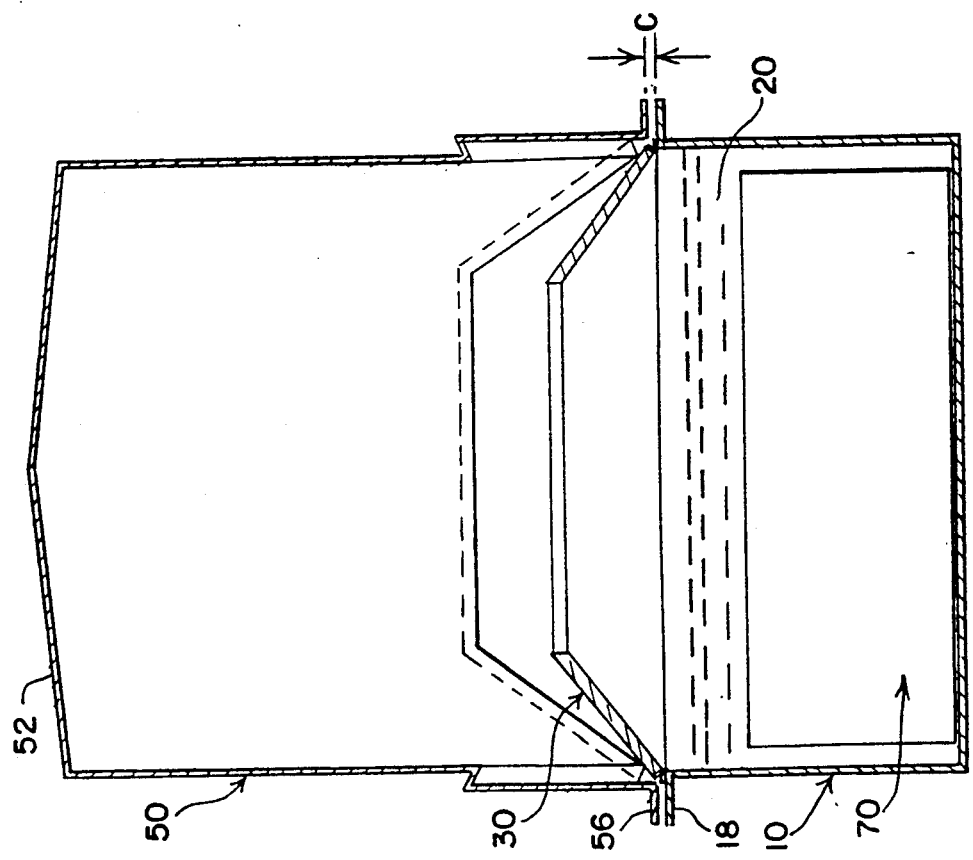

POLLUTION ABATING VAPOR TRAP AND CONDENSER APPARATUS

BACKGROUND OF THE INVENTION

The present invention relates to chemical processing and solvent cleaning tanks, and more particularly to an apparatus and method for abating discharges of chemicals into the environment.

Chemical processing and solvent cleaning tanks have long been used to treat parts or materials. The process typically involves immersing the parts or materials to be treated, called the workload, into a processing tank containing a chemical or solvent bath. The processing tank typically has an open top to permit easy ingress and egress of the workload. The workload dwells in the processing tank for a period of time sufficient to complete the treatment. The workload is then removed from the processing tank and allowed to drain. From there, the workload may undergo additional treatments in separate processing tanks. The specific chemicals or solvents employed, and the workload dwell time required, are determined by the type of treatment process used and are well known within the art.

Because of the volatile nature of the chemicals and solvents typically employed, and the open design of most chemical processing tanks, vapors and mist emanating from the processing tank are discharged into the atmosphere. These chemical vapors often present hazards to both workers and the environment. In addition to health hazards, many solvents present fire and explosive hazards. Moreover, chemicals and solvents discharged into the atmosphere are difficult to reclaim and will consequently be counted as pollutants entering the waste stream. As a result, additional chemicals and solvents must be manufactured or purchased to replace those lost to the waste stream.

Chemical processing and solvent cleaning tanks are often heated above ambient temperature to increase the effectiveness of the treatment process and to reduce dwell time. Unfortunately, raising the temperature of the chemicals or solvents significantly increases their volatility, thereby increasing atmospheric emissions. The processing tank may also be agitated to increase the effectiveness of the treatment process. Agitation will likewise increase emissions.

The simplest but least effective prior art method for reducing vapor emissions consists of increasing the processing tank "freeboard." The freeboard is that portion of the tank sidewalls which extends above the chemical or solvent bath. The freeboard provides, within the confinement of the tank sidewalls, a zone in which vapors emanating from the bath can begin to cool. Hopefully, some of the vapors will recondense into a liquid within this zone and fall back into the processing tank.

A second prior art method for reducing vapor emissions involves installing cooling coils along the freeboard of the sidewalls just below the top of tank lip opening. The cooling coils aim to create a cold air blanket across the top of the tank opening. This cold air blanket increases the recondensation of the vapors emanating from the bath and further reduces emissions.

A third prior art method for reducing vapor emission involves adding a push-pull ventilation system just above the tank lip. The ventilation system attempts to capture any vapors which have not recondensed within the freeboard. The captured vapors are then directed to an exhaust system. In turn, the exhaust system may be equipped with pollution abatement equipment such as a scrubber or a carbon absorption device to reduce or prevent emissions into the atmosphere. Ventilation systems are typically installed over processing tanks where exposure to the chemical vapors would be harmful to the worker.

Finally, a lid can be used on the top of the processing tank to prevent emissions. But, the lid must be removed each time the workload is placed in, or removed from, the processing tank, thereby releasing chemical vapors into the atmosphere.

The prior art methods described above can be used separately or in any combination to reduce the amount of atmospheric emissions. However, none of the above methods, or combinations thereof, will provide for complete abatement of chemical vapor emissions. Nor do any of the above methods address the problem of fire or explosive hazards. In addition, there are a number of problems with the prior art methods which greatly reduce their effectiveness.

In all of the above prior art methods, air is utilized as the thermal transfer medium. It is well known within the art that air is a very poor thermal conductor. As a result, increasing the processing tank freeboard alone in order to contain all of the chemical vapor emissions would require raising the tank lip above the bath a distance equal to several times the length of the tank opening. A processing tank of such a configuration would be impractical to use.

For cooling coils to be effective, they must be capable of generating a continuous cold air blanket across the entire processing tank opening. To achieve this, the operating temperature of the cooling coils must be set extremely low ($-10$ degrees Fahrenheit is presently considered "Best Available Control Technology"). This leads to several problems. First, low operating temperatures will cause atmospheric water vapor to condense and contaminate the chemical or solvent bath. Where solvents are involved, water is an extremely undesirable contaminant. Second, low operating temperatures lead to the freezing of chemical and atmospheric water vapors, resulting in the formation of ice on the cooling coils. This leads to a loss of efficiency which causes the air blanket to warm. Eventually, the blanket will develop a "hole" through which chemical vapors may escape into the atmosphere.

Finally, ventilation systems do little to abate chemical vapor emissions. Their primary function is to protect workers from exposure to the chemical vapors.

SUMMARY OF THE INVENTION

The invention provides an apparatus and method for trapping and recondensing vapors emanating from chemical processing and solvent cleaning tanks, so as to abate emissions and discharges of chemicals into the atmosphere or a waste stream. The apparatus and method also eliminates contamination of the processing tank due to atmospheric water vapor condensation and provides an inert environment to reduce the possibility of fire or explosion.

The apparatus comprises a retractable top near the top of the processing tank which creates a physically well defined, stable, and fully controlled equithermal surface to trap, condense and collect chemical vapors emanating from the chemical or solvent bath. The apparatus further comprises a shroud to trap, condense and collect any chemical vapors which may migrate past the retractable top while the workload is being immersed or removed from the processing tank.

The invention also provides a method for using the apparatus disclosed.

BRIEF DESCRIPTION OF THE DRAWINGS

FIG. 1 is a perspective view of a shroud and workload positioned over a processing tank.

FIG. 2 is a cross-sectional view of a shroud resting on a processing tank.

FIG. 3 is a sectional view taken along line 3—3 of FIG. 2.

FIG. 4 is a cross-sectional view of a shroud, a workload and a processing tank fitted with a retractable top.

FIG. 5 is a cross sectional view of a workload immersed in a processing tank.

FIG. 6 is a cross-sectional view of a workload during drainage.

DETAILED DESCRIPTION OF THE PREFERRED EMBODIMENT

Referring to FIG. 1, the apparatus for the processing tank 10 comprises a retractable top 30 near the top of processing tank 10 and a shroud 50 enclosing the top of the processing tank. A workload 70 is enclosed within the shroud above the processing tank 10.

The processing tank 10 may be new or existing. It is of standard design and construction for the specific chemicals and operating requirements for the processing step to be performed. In the preferred embodiment shown, the processing tank 10 has an interior area formed by a bottom 12, a plurality of sides 14, a plurality of ends 16 and an open top. The processing tank 10 may further comprise a lip 18 along the top to support the shroud 50. The interior area of the processing tank 10 holds a chemical bath 20. The freeboard 22 is that portion of the interior surface of the sides 14 and the ends 16 extending from the upper surface of the chemical bath 20 to the top of the processing tank 10. The processing tank 10 may further comprise a means for heating or cooling the chemical bath 20. The processing tank 10 may further comprise a means for agitating the chemical bath 20.

The workload 70 is any envelope of material, parts, or objects which are to be lowered into and treated by the chemical bath 20. The workload 70 further comprises all accessory tooling, racks, jigs and fixtures used to hold, transport, and immerse the objects into the chemical bath 20.

The retractable top 30 is connected near the top of the processing tank 10 and may be of any design or construction which will trap, condense and collect chemical vapors emanating from the chemical bath 20 and prevent contamination of the processing tank 10 due to atmospheric water vapor condensation. The retractable top 30 forms a first interior area below the top 30 when closed. In the preferred embodiment shown, the first interior area of the retractable top 30 is formed by a plurality of side panels 32, a plurality of end panels 34 and an open bottom. The retractable top 30 further comprises a means for controlling the temperature of the interior surface of each of the plurality of side panels 32 and end panels 34.

The side panels 32 are trapezoidal shaped and the end panels 34 are triangular shaped so as to form a hip roof over the processing tank 10 when the retractable top 30 is closed. The slope of each of the plurality of side panels 32 and end panels 34 is such that any condensate which forms on the interior surface of the panels will drain downward into the processing tank 10. The minimum required slope is a function of the condensate's specific gravity and surface tension coefficient. The lower edge 36 of each of the plurality of side panels 32 is hinged to the side 14 near the top of the processing tank 10. Likewise, the lower edge 36 of each of the plurality of end panels 34 is hinged to the ends 16 near the top of the processing tank 10. The retractable top 30 comprises a means for outwardly rotating each of the plurality of side panels 32 and end panels 34 about its lower edge 36 to a vertical or open position. The edges 38 of each of the plurality of side panels 32 and end panels 34 are beveled so as to form a seal between each of the panels.

As shown in FIG. 2, the shroud 50 sits on top of the processing tank 10 and may be of any design or construction which will trap, condense and collect chemical vapors emanating from the processing tank 10. In the preferred embodiment shown, the shroud 50 has a second interior area formed by a top 52, a plurality of side walls 54 and an open bottom. The workload 70 is enclosed within the interior area of the shroud 50 prior to and after the workload 70 is treated in the processing tank 10. The shroud 50 may further comprise a flange 56 along the bottom edge of the shroud 50 which will rest on top of the lip 18 of the processing tank 10. The shroud 50 may further comprise a means for raising and lowering the shroud 50 on to the top of the processing tank 10 and a means for supporting, raising and lowering the workload 70 into the processing tank 10.

The geometry, material, and surface finish condition of the interior surface of the shroud 50 is designed to promote the formation and drainage of condensate. In the preferred embodiment shown, the interior surface of the shroud 50 is smooth polished to promote drainage of the condensate. The interior surface of the shroud 50 is formed, clad or coated with a material, chemically compatible with the chemical bath 20, possessing a high surface tension coefficient to enhance beading and subsequent drainage of the condensate. For example, the interior surface of the shroud 50 may be formed with polished stainless steel or may be coated with teflon. The interior surface of the top 52 is sloped downwards from the center of the top 52 to the side walls 54 to promote drainage of the condensate. The minimum required slope is a function of the condensate's specific gravity and surface tension coefficient.

Referring to FIGS. 2 and 3, each of the plurality of side walls 54 has an outwardly extending pocket 58 near the bottom of the shroud 50. The pockets 58 are designed to accept the side panels 32 and the end panels 34 of the retractable top 30 when the side panels 32 and the end panels 34 are in the vertical or open position. The edges 60 of the pockets 58 are beveled to form a close fit with the beveled edges 38 of the side panels 32 and the end panels 34. The interior surface of the side walls 54 are inward of the interior surface of the side panels 32 and the end panels 34 so that the condensate on the interior surface of the side walls 54 will drip directly into the processing tank without contacting the side panels 32 or the end panels 34. Likewise, the interior surface of the side panels 32 and the end panels 34 are inward of the interior surface of the sides 14 and the ends 16 so that any condensate on the interior surface of the side panels 32 and the end panels 34 will drip directly into the processing tank 10 without contacting the sides 14 or the ends 16 of the processing tank 10. This arrangement directs the draining condensate away from interfaces where leakage might occur.

As illustrated in FIG. 4, in the preferred method of operation for the apparatus described above, the processing tank 10 has been filled with the chemical bath 20. The retractable top 30 is then closed to prevent any atmospheric emissions of vapors emanating from the chemical bath 20. The shroud 50 and the workload 70 are located either above or near by the processing tank 10.

The interior surface of the retractable top 30 is then cooled to its operating temperature Ts. The operating temperature Ts is an engineered value and is calculated by first determining the local climatic conditions, namely, the ambient temperature Ta and the barometric pressure. The ambient temperature Ta is determined by the local climatic conditions, or by the building's Heating/Ventilating/Air Conditioning (HVAC) System in which the processing equipment is set-up. The barometric pressure is known, or is readily available from local authorities. By selecting the highest probable value for the ambient temperature Ta and the lowest probable value for the barometric pressure, the lowest temperature required to reach Dew Point Td can be determined for the most volatile chemical contained in the chemical bath 20.

The temperature at which each of the chemicals contained in the chemical bath 20 will reach Freezing Point Tf is known, or can be readily determined. The highest freezing point temperature Tf of the chemicals is then selected. The operating temperature Ts is set at a temperature which is halfway between the dew point temperature Td and the freezing point temperature Tf. In the above calculations, water is preferably included as one of the chemicals contained in the chemical bath 20 since it is always present.

Should the freezing point temperature Tf exceed the dew point temperature Td, then the operating temperature Ts is set equal to or less than the dew point temperature Td. This will result in the formation of some ice on the interior surface of the retractable top 30, which will require periodic defrosting of the top 30.

The chemical bath 20 is then heated to the specified operating temperature Tp recommended for the processing tank. In practical conditions, a nominal set point and a control tolerance are given.

Referring again to FIG. 1, the shroud 50 is then brought directly over the workload 70. The shroud 50 is then lowered so as to enclose the workload 70 inside the shroud 50 near the top 52. The shroud 50 is then placed directly over the processing tank 10 and lowered to within a distance C from the tank lip 18. As best seen in FIG. 3, the distance C equals the vertical length of the bevel of the edge 60 of the pocket 58 of the shroud 50. Should the chemicals in the processing tank 10 pose fire or explosive hazards, a means may then be used for introducing an inert gas such as dry nitrogen into the interior area of the shroud 50.

Referring to FIG. 2, each of the plurality of side panels 32 and end panels 34 are rotated outwardly to open the retractable top 30. The shroud 50 is then lowered onto the processing tank 10 so that each of the plurality of side panels 32 and end panels 34 are nested within the pockets 58 of the shroud 50.

As illustrated in FIG. 5, the workload 70 is then lowered into the processing tank 10 and immersed in the chemical bath 20. The shroud 50 is raised a distance C above the processing tank 10 and the retractable top 30 is closed. The shroud 50 is then lowered back onto the processing tank 10. The workload 70 dwells in the chemical bath 20 for the specified time.

As shown in FIG. 6, the shroud 50 is again raised a distance C and the retractable top 30 is again opened. The shroud 50 is lowered back onto the processing tank 10. The workload 70 is then raised to a height just above the upper surface of the chemical bath 20 where it is allowed to drain. The top of the workload 70 should not extend above the tops of each of the plurality of side panels 32 and end panels 34.

After the workload 70 has drained, it is raised to near the top 52 of the shroud 50. The shroud 50 is raised a distance C and the retractable top 30 is closed. If necessary, the interior area of the shroud 50 may then be flushed free of any remaining chemical vapors via a forced exhaust fan. The shroud 50 and workload 70 are then ready to be removed and translated to the next processing tank, if any.

While the retractable top 30 is closed, any chemical vapors emanating from the chemical bath 20 are physically contained within the processing tank 10 by the top 30. Furthermore, the retractable top 30 creates an equithermal zone at the operating temperature Ts across the top of the processing tank 10. This causes the chemical vapors to cool down below the dew point temperature Tdp and recondense on the interior surface of the plurality of side panels 32 and end panels 34. From there, the condensate will drip back into the processing tank 10.

While the shroud 50 is raised a distance C above the processing tank 10 to permit the opening and closing of the retractable top 30, the equithermal zone will prevent most, if not all, of the chemical vapors from emanating into the shroud 50 or escaping into the atmosphere. The speed at which the plurality of the side panels 32 and the end panels 54 are rotated may affect the integrity of the equithermal zone.

While the retractable top 30 is open to permit the ingress, egress and drainage of the workload 70, the equithermal zone will prevent most, if not all, of the chemical vapors from emanating into the shroud 50. The configuration of the workload 70 and the speed at which it is raised lowered will significantly affect the integrity of equithermal zone. In any event, any chemical vapors which emanate into the shroud 50 should recondense on the interior surface of the shroud 50 and drain back into the processing tank 10.

Any chemical vapors which have not recondensed and drained back into the processing tank 10 will be contained within the shroud 50. A commercially available scrubber can also be attached to the shroud 50, thus removing further quantities of the chemical vapors entrapped in the shroud's atmosphere. If explosive or combustible fumes are present, a commercially available lowest explosive limit detector can also be attached to the shroud 50 to ascertain whether the fumes within the interior area of the shroud 50 are at a safe level prior to removal of the shroud 50 from the process tank 10.

The only water vapor which may condense and contaminate the chemical bath 20 is contained within the shroud 50 prior to its placement on the processing tank 10. This amount of contamination is considered insignificant. In any event, the interior area of the shroud 50 may be flushed free of any water vapor via a forced exhaust fan.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A vapor trap and condenser apparatus for a chemical processing tank having an open top comprising:
   a) a retractable top, said top adapted to fit over the open top of the tank, wherein the retractable top comprises two triangular shaped end panels and two trapezoidal shaped side panels, said panels being capable of forming a hip roof over the open top of the tank when closed;
   b) a shroud, said shroud adapted to fit over the retractable top, wherein the shroud comprises a top, a plurality of side walls and an open bottom;
   c) means for controlling the temperature of said retractable top;
   d) means for opening and closing said retractable top; and
   e) means for raising and lowering said shroud over said retractable top; and
   f) means for raising and lowering a workload into the tank.

2. The apparatus of claim 1 wherein said shroud has an interior surface which is smooth polished.

3. The apparatus of claim 1 wherein said shroud has an interior top surface which is sloped downwards from the center to the side walls.

4. The apparatus of claim 1 wherein said shroud has an interior surface which has a high surface tension coefficient.

5. The apparatus of claim 1 wherein said shroud further comprises a flange at the bottom.

6. The apparatus of claim 1 wherein said shroud further comprises a scrubber.

7. The apparatus of claim 1 wherein said shroud further comprises a means for introducing an inert gas within the shroud.

8. The apparatus of claim 1 wherein said shroud further comprises a lowest explosive limit detector.

9. The apparatus of claim 1 wherein said shroud further comprises outwardly extending pockets at the bottom.

10. The apparatus of claim 1 wherein said panels of said retractable top are pivotally connected near the open top of the tank.

11. A vapor trap and condenser apparatus for a chemical processing tank having an open top comprising:
   a) a retractable top, said top adapted to fit over the open top of the tank, wherein the retractable top comprises two triangular shaped end panels and two trapezoidal shaped side panels, said panels being capable of forming a hip roof over the open top of the tank when closed;
   b) a shroud, said shroud adapted to fit over the retractable top, wherein the shroud comprises a top, a plurality of said walls and an open bottom;
   c) means for opening and closing said retractable top; and
   d) means for raising and lower said shroud over said retractable top.

* * * * *

UNITED STATES PATENT AND TRADEMARK OFFICE
CERTIFICATE OF CORRECTION

PATENT NO. : 5,267,581
DATED : December 7, 1993
INVENTOR(S) : Pierre C. Morinaud It is certified that error appears in the above-indentified patent and that said Letters Patent is hereby corrected as shown below:

In the Figures

In the lower lefthand box of Figure 1 on the title page and on Sheet 1 of 4, please delete "retractabe" and substitute --retractable--.

In the Abstract

In line 1 after "method" insert --of--.

In column 5, line 10, delete "near by" and substitute --nearby--.

In column 6, line 46, after "raised" insert --or--.

UNITED STATES PATENT AND TRADEMARK OFFICE
CERTIFICATE OF CORRECTION

PATENT NO. : 5,267,581
DATED : December 7, 1993
INVENTOR(S) : Pierre C. Morinaud It is certified that error appears in the above-indentified patent and that said Letters Patent is hereby corrected as shown below:

In column 7, claim 1, line 15, delete "and".

In column 8, claim 11, line 11, delete "said" and substitute --side--.

Signed and Sealed this

Fourteenth Day of November, 1995

Attest:

BRUCE LEHMAN

*Attesting Officer*     *Commissioner of Patents and Trademarks*